United States Patent
Park (10) Patent No.: US 9,985,523 B2
(45) Date of Patent: May 29, 2018

(54) DC-DC CONVERTER AND ORGANIC LIGHT EMITTING DISPLAY DEVICE HAVING THE SAME

(71) Applicant: SAMSUNG DISPLAY CO., LTD., Yongin, Gyeonggi-Do (KR)

(72) Inventor: Sung-Chun Park, Suwon-si (KR)

(73) Assignee: Samsung Display Co., Ltd., Yongin, Gyeonggi-do (KR)

(*) Notice: Subject to any disclaimer, the term of this patent is extended or adjusted under 35 U.S.C. 154(b) by 572 days.

(21) Appl. No.: 14/611,505

(22) Filed: Feb. 2, 2015

(65) Prior Publication Data

US 2016/0049872 A1 Feb. 18, 2016

(30) Foreign Application Priority Data

Aug. 18, 2014 (KR) .................. 10-2014-0107106

(51) Int. Cl.
*H02M 3/158* (2006.01)
*H02M 1/088* (2006.01)
(Continued)

(52) U.S. Cl.
CPC .......... *H02M 3/158* (2013.01); *G09G 3/2096* (2013.01); *G09G 3/3208* (2013.01);
(Continued)

(58) Field of Classification Search
CPC ............. G09G 2330/02; G09G 3/2096; G09G 3/3208; H02M 1/088; H02M 2001/0077;
(Continued)

(56) References Cited

U.S. PATENT DOCUMENTS

| 5,191,519 A * | 3/1993 | Kawakami ................ H02J 3/46 363/71 |
| 2002/0036486 A1* | 3/2002 | Zhou ........................ G05F 1/62 323/272 |
| 2007/0029945 A1* | 2/2007 | Yu ..................... H02M 7/53871 315/224 |

(Continued)

FOREIGN PATENT DOCUMENTS

| KR | 10-2011-0032500 A | 3/2011 |
| KR | 10-2011-0054214 A | 5/2011 |
| KR | 10-2012-0114813 A | 10/2012 |

OTHER PUBLICATIONS

European Search Report dated Dec. 17, 2015 in Corresponding European Patent Application No. 15163151.2.

*Primary Examiner* — Adolf Berhane
*Assistant Examiner* — Bart Iliya
(74) *Attorney, Agent, or Firm* — Lee & Morse, P.C.

(57) ABSTRACT

A DC-DC converter includes first and second converters. The first converter generates a first power voltage based on a power voltage from an input terminal, and outputs the first power voltage to a first output terminal. The second converter generates a second power voltage based on the input power voltage, and outputs the second power voltage to a second output terminal. The second converter includes a plurality of inverting converters and a controller. The inverting converters generate a check current to check a connection state of an inductor when the inductor is connected. The second power voltage is generated by converting the input power voltage in response to a PWM signal. The controller generates a driving control signal based on the check current to operate a predetermined number of the inverting converters connected to the inductor, and to control the inverting converters based on the driving control signal.

21 Claims, 8 Drawing Sheets

(51) Int. Cl.
*H02M 1/00* (2006.01)
*G09G 3/3208* (2016.01)
*G09G 3/20* (2006.01)

(52) U.S. Cl.
CPC ......... *H02M 1/088* (2013.01); *H02M 3/1582* (2013.01); *H02M 3/1584* (2013.01); *G09G 2330/02* (2013.01); *H02M 2001/0077* (2013.01); *H02M 2003/1586* (2013.01)

(58) Field of Classification Search
CPC ......... H02M 2003/1586; H02M 3/158; H02M 3/1582; H02M 3/1584
See application file for complete search history.

(56) References Cited

U.S. PATENT DOCUMENTS

| | | | |
|---|---|---|---|
| 2007/0146565 A1* | 6/2007 | Jeon | G02F 1/133603 349/42 |
| 2009/0224740 A1* | 9/2009 | Imura | G05F 1/575 323/282 |
| 2010/0315051 A1 | 12/2010 | Maher | |
| 2011/0115777 A1 | 5/2011 | Park | |
| 2012/0256561 A1 | 10/2012 | Kwon | |
| 2013/0002639 A1* | 1/2013 | Park | G09G 3/3225 345/212 |
| 2013/0147445 A1 | 6/2013 | Levesque et al. | |
| 2013/0176075 A1 | 7/2013 | Kay et al. | |
| 2013/0235017 A1 | 9/2013 | Park | |
| 2013/0293207 A1 | 11/2013 | Wei et al. | |
| 2015/0049519 A1* | 2/2015 | Izadian | H02M 1/08 363/21.02 |

\* cited by examiner

DC-DC CONVERTER AND ORGANIC LIGHT EMITTING DISPLAY DEVICE HAVING THE SAME

CROSS-REFERENCE TO RELATED APPLICATION

Korean Patent Application No. 10-2014-0107106, filed on Aug. 18, 2014, and entitled, "DC-DC Converter and Organic Light Emitting Display Device Having the Same," is incorporated by reference herein in its entirety.

BACKGROUND

1. Field

One or more embodiments described herein relate to a DC-DC converter and an organic light emitting display device having a DC-DC converter.

2. Description of the Related Art

An organic light emitting display device displays images based on light emitted from pixels that include organic light emitting diodes. An organic light emitting diode includes an organic layer between an anode and cathode. Holes from the anode combine with electrons from the cathode in the organic layer to induce emission of light.

An organic light emitting display device may include a DC-DC converter. The DC-DC converter changes an input power voltage to one or more power voltages required for driving the pixels. For example, a DC-DC converter may supply a high power voltage and a low power voltage to the pixels through power source lines.

The amount of driving current flowing through a display panel may increase as the size of the display panel increases. Therefore, conduction loss may occur as a result of internal resistances of the DC-DC converter. Conduction loss decreases conversion efficiency of and increases heat generated by the DC-DC converter.

SUMMARY

In accordance with one embodiment, a DC-DC converter includes a first converter to generate a first power voltage based on an input power voltage from an input terminal, and to output the first power voltage to a first output terminal; and a second converter to generate a second power voltage lower than the first power voltage based on the input power voltage, and to output the second power voltage to a second output terminal. The second converter includes a plurality of inverting converters to generate a check current to check a connection state of an inductor when the inductor is connected and to output the second power voltage, the second power voltage to be generated by converting the input power voltage in response to a pulse width modulation (PWM) signal; and an inverting converter controller to generate a driving control signal based on the check current to operate a predetermined number of the inverting converters connected to the inductor, and to control the inverting converters based on the driving control signal.

Each of the inverting converters may include a switch circuit including a plurality of switch transistors, the switch circuit to convert the input power voltage to the second power voltage by turning on or off one or more of the switch transistors; a switch controller to control switching operations of the switch transistors based on the PWM signal; and a PWM controller to generate the PWM signal based on the driving control signal.

The switch circuit may includes a first switch transistor between the input terminal and a first node; a second switch transistor between the first node and the second output terminal; and a third switch transistor between the input terminal and the inverting converter controller, the third switch transistor to provide the check current to the inverting converter controller when the inductor is connected between the first node and a reference voltage. The first switch transistor and the third switch transistor may operate based on a same control signal. The first switch transistor and the second switch transistor may be alternately turned on and off.

The second converter may include a feedback circuit to compare a feedback voltage from the second output terminal with a first reference voltage, and to output a comparison result to the PWM controller.

The inverting converter controller may include a number of current sensors to check whether the inverting converters are connected to the inductor based on the check current from the inverting converters to generate a check voltage; and a driving controller to generate the driving control signal based on the check voltage and to provide the driving control signal to the inverting converters.

When each of the number of current sensors receives a sensing signal, each of the current sensors may generate a sensing voltage based on the check current and is to check the connection state of the inductor by comparing the sensing voltage with a second reference voltage. When the driving controller receives a driving mode selecting signal, the driving controller may generate the driving control signal corresponding to the driving mode selecting signal and is to control the inverting converters based on the driving control signal. The inverting converters may include a first inverting converter and a second inverting converter.

A first PWM signal of the first inverting converter and a second PWM signal of the second inverting converter may have a first frequency during a simultaneous driving mode, in which the first inverting converter and the second inverting converter operate simultaneously, and the first PWM signal of the first inverting converter may have a second frequency a predetermined number of times larger than the first frequency during a single driving mode, in which the first inverting converter operates and the second inverting converter does not operate. The first PWM signal and the second PWM signal may have opposite phases during the simultaneous driving mode.

In accordance with another embodiment, an organic light emitting display device includes a display panel including a plurality of pixels; a scan driver to provide a scan signal to the pixels; a data driver to provide a data signal to the pixels; and a DC-DC converter to generate a first power voltage and a second power voltage lower than the first power voltage, and to provide the first power voltage and the second power voltage to the pixels. The DC-DC converter includes a first converter to generate the first power voltage based on an input power voltage from an input terminal, and to output the first power voltage to a first output terminal; and a second converter to generate the second power voltage based on the input power voltage and to output the second power voltage to a second output terminal.

The second converter includes a plurality of inverting converters to generate a check current to check a connection state of an inductor when the inductor is connected and to output the second power voltage, the second power voltage to be generated by converting the input power voltage based on a PWM signal; and an inverting converter controller to generate a driving control signal based on the check current to operate a predetermined number of the inverting converters connected to the inductor and to control the inverting converters based on the driving control signal.

Each of the inverting converters may include a switch circuit including a plurality of switch transistors, the switch circuit to convert the input power voltage to the second power voltage by turning on or off the switch transistors; a switch controller to control switching operations of the switch transistors based on the PWM signal; and a PWM controller to generate the PWM signal based on the driving control signal.

The switch circuit may include a first switch transistor between the input terminal and a first node; a second switch transistor between the first node and the second output terminal; and a third switch transistor between the input terminal and the inverting converter controller, the third switch transistor providing the check current to the inverting converter controller when the inductor is connected between the first node and a ground voltage.

The inverting converter controller may include a number of current sensors to check whether the inverting converters is connected to the inductor based on the check current from the inverting converters, and to generate a check voltage; and a driving controller to generate the driving control signal based on the check voltage, and to provide the driving control signal to the inverting converters.

When the driving controller receives a driving mode selecting signal, the driving controller may generate the driving control signal corresponding to the driving mode selecting signal and is to control the inverting converters based on the driving control signal. When the inverting converters include a first and second inverting converters.

A first PWM signal of the first inverting converter and a second PWM signal of the second inverting converter may have a first frequency during a simultaneous driving mode, in which the first inverting converter and the second inverting converter operate simultaneously, and the first PWM signal of the first inverting converter may have a second frequency two times larger than the first frequency during a single driving mode, in which the first inverting converter operates and the second inverting converter does not operate. The first PWM signal and the second PWM signal may have opposite phases during the simultaneous driving mode.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
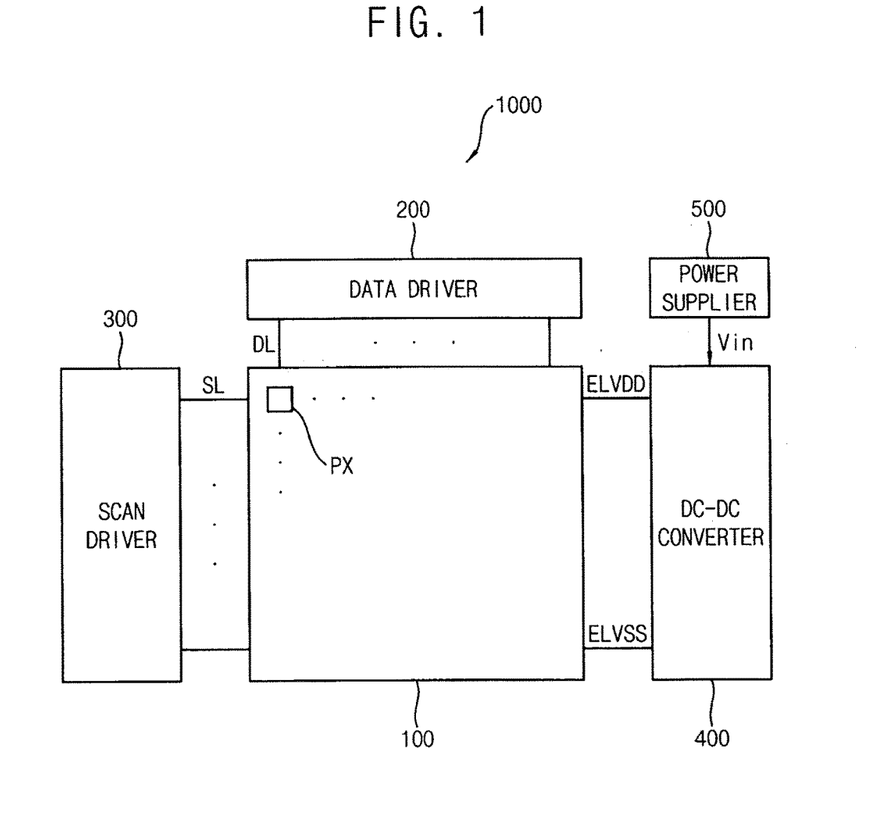
FIG. 1 illustrates an embodiment of an organic light emitting display device.

FIG. 1 illustrates an embodiment of an organic light emitting display device 1000 which includes a display panel 100, a scan driver 200, a data driver 300, and a DC-DC converter 400.

The display panel 100 may be connected to the data driver 200 via data lines DL. The display panel 100 may be connected to the scan driver 300 via scan lines SL. The display panel 100 includes n*m pixels PX, with the pixels PX arranged at locations that correspond to crossing points of the scan lines SL and the data lines DL.

The scan driver 200 provides scan signals to the pixels PX via the scan lines SL.

The data driver 300 provides data signals to the pixels PX via the data lines DL.

The DC-DC converter 400 may generate a first power voltage ELVDD and a second power voltage ELVSS. The DC-DC converter 400 provides the first power voltage ELVDD and the second power voltage ELVSS to the pixels PX. The DC-DC converter 400 includes a first converter and a second converter. The first converter generates the first power voltage ELVDD based on input power voltage Vin from an input terminal. The first power voltage ELVDD is output through a first output terminal. The second converter generates the second power voltage ELVSS based on input power voltage Vin. The second power voltage ELVSS is output to a second output terminal.

In one embodiment, the first power voltage ELVDD may be a high power voltage and the second power voltage ELVSS may be a low power voltage, e.g., ELVDD is greater than ELVSS. The input power voltage Vin may be provided from a power supplier 500. The power supplier 500 may be a battery providing DC voltage, a rectifying device converting AC voltage to DC voltage, or another type of circuit.

The second converter in the DC-DC converter 400 may include a plurality of inverting converters and an inverting converter controller. Each of the inverting converters may generate a check current for checking a connection state of an inductor when the inductor is connected. The second power voltage ELVSS may be generated by converting the input power voltage Vin, for example, in response to a pulse width modulation (PWM) signal.

The inverting converter controller may generate a driving control signal based on the check current. The driving control signal may control only a predetermined number (e.g., one or more) of the inverting converters connected to the inductor to operate. Therefore, the DC-DC converter 400 may automatically control a driving mode of inverting converter based on a connection state of an inductor. This may reduce ripple in an output voltage and increase conversion efficiency of DC-DC converter 400.

The organic light emitting display device 1000 may further include a timing controller to generate timing control signals for controlling the data driver 200, the scan driver 300, and an emission driver providing emission signals to the pixels PX.

Therefore, the organic light emitting display device 1000 including the DC-DC converter 400 may reduce a conduction loss and a heat generated by the DC-DC converter 400. Because the power voltages are generated using a plurality of inverting converters to drive a large scale display panel, an amount of current flowing through each inductor may be decreased and the conduction loss may be reduced. In addition, the organic light emitting display device 1000 may not require large scale inductors or switching transistors for reducing the conduction loss. This will allow for a reduction in the size of the organic light emitting display device 1000.

Figure 2:
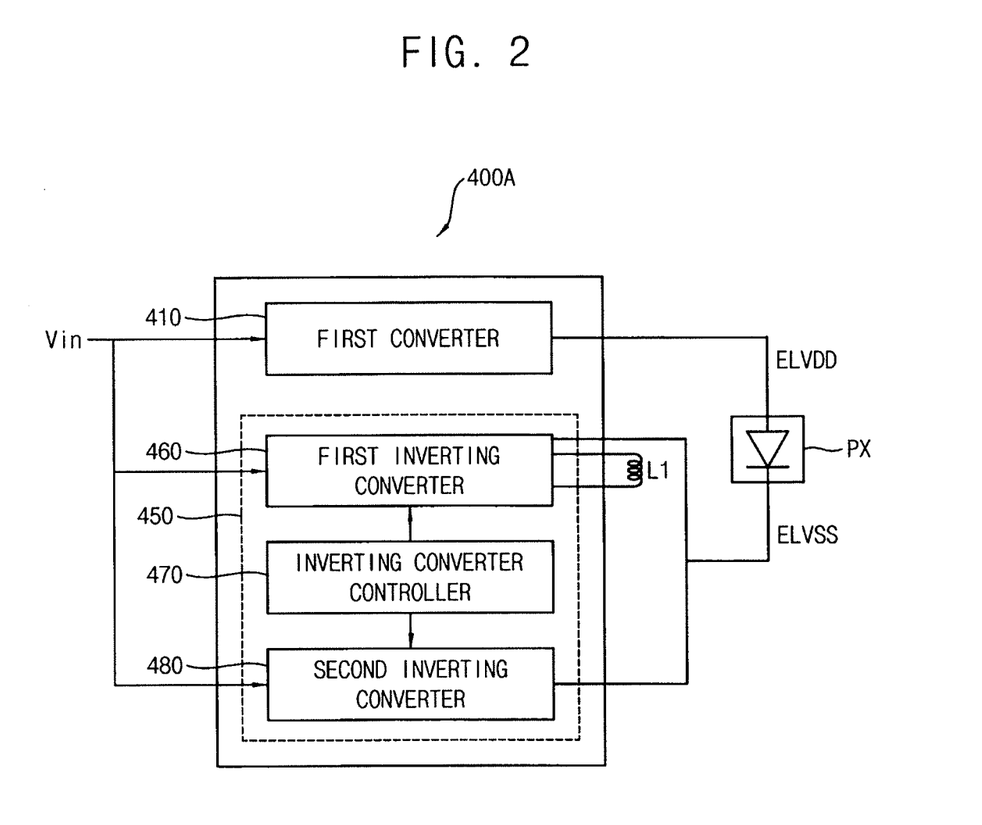
FIG. 2 illustrates an embodiment of a DC-DC converter.

FIG. 2 illustrates an embodiment of a DC-DC converter 400A, which, for example, may correspond to the DC-DC converter 400.

Referring to FIG. 2, the DC-DC converter 400A may include a first converter 410 and a second converter 450. The first converter 410 may generate a first power voltage ELVDD based on an input power voltage Vin from an input terminal, and may output the first power voltage ELVDD to a first output terminal. For example, the first converter 410 may output the first power voltage ELVDD by boosting the input power voltage Vin using a boost converter.

The second converter 450 may generate a second power voltage ELVSS based on the input power voltage Vin, and may output the second power voltage ELVSS to a second output terminal. For example, the second converter 450 may output the second power voltage ELVSS by inverting the input power voltage Vin using a buck boost converter.

The second converter 450 may include a first inverting converter 460, a second inverting converter 480, and an inverting converter controller 470. The first inverting converter 460 and the second inverting converter 480 may operate when the inductor is connected. Thus, the inverting converter to which the inductor is connected may convert the input power voltage Vin to the second power voltage ELVSS and may output the second power voltage ELVSS. On the other hand, the inverting converter to which the inductor is not connected may not operate.

In FIG. 2, the first inverting converter 460 may be connected to a first inductor L1. The first inverting converter 460 may generate a check current for checking a connection state of an inductor and provide the check current to the inverting converter controller 470. A switch circuit in the first inverting converter 460 may operate in response to a PWM signal. The first inverting converter 460 may convert the input power voltage Vin to the second power voltage ELVSS by allowing or preventing a current to flow through the first inductor L1 using the switch circuit. The first inverting converter 460 may output the second power voltage ELVSS.

The second inverting converter 480 may be not connected to an inductor. The second inverting converter 480 may not operate when the second inverting converter 480 is not connected to the inductor.

The inverting converter controller 470 may generate a driving control signal based on the check current to operate some of the inverting converters connected to the inductor, and may control the inverting converters based on the driving control signal. For example, the inverting converter controller 470 may control the first inverting converter 460 and the second inverting converter 480 based on the check current from the first inverting converter 460, such that the second converter 450 operates in a single driving mode in which the first inverting converter 460 operates and the second inverting converter 480 does not operate. The inverting converter controller 470 may provide a first driving control signal to the first inverting converter 460, such that the first inverting converter 460 operates at a frequency corresponding to the single driving mode. The inverting converter controller 470 may provide a second driving control signal to the second inverting converter 480, such that the second inverting converter 480 does not operate.

Therefore, the DC-DC converter 400A may operate as the single driving mode and output the second power voltage ELVSS using only the first inverting converter 460. For example, when the capability of each inverting converter is 500 mA, the DC-DC converter 400A may provide power voltages to the display panel through which current lower than 500 mA flows. The DC-DC converter 400A may generate the power voltages using only one of the inverting converters, for providing the power voltages to the display panel through which current lower than 500 mA flows, to thereby achieve higher conversion efficiency in comparison with a simultaneous driving mode.

Figure 3:
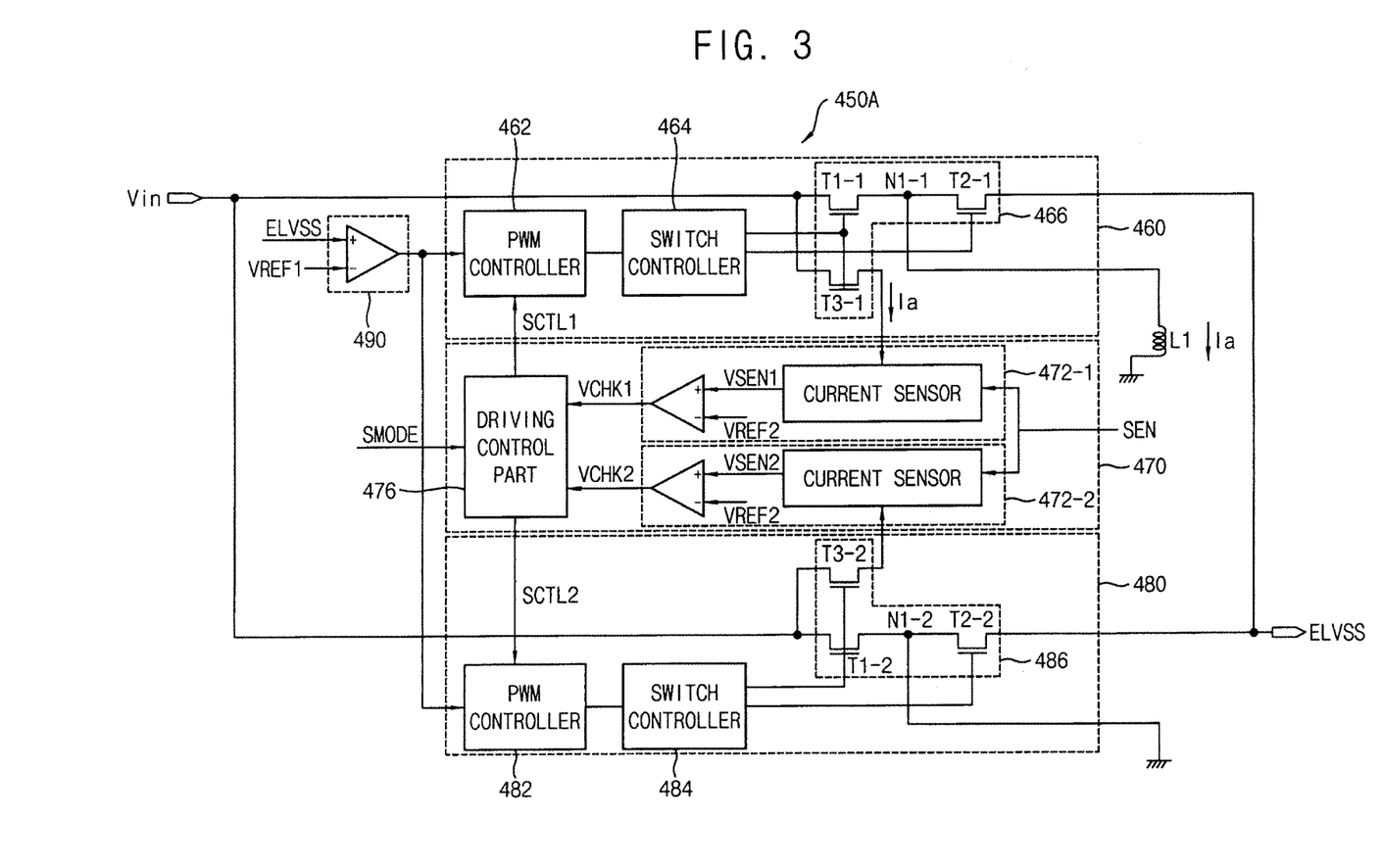
FIG. 3 illustrates an embodiment of a second converter in the DC-DC converter.

FIG. 3 illustrates an embodiment of a second converter 450, which, for example, may be included in the DC-DC converter of FIG. 2. Referring to FIG. 3, the second converter 450A includes a first inverting converter 460, a second inverting converter 480, and an inverting converter controller 470.

The first inverting converter 460 includes a PWM controller 462, a switch controller 464, and a switch circuit 466. The first inverting converter 460 is connected to an inductor L1 and generates a check current Ia. The first inverting converter 460 outputs a second power voltage ELVSS by converting the input power voltage Vin.

The PWM controller 462 generates the PWM signal based on the driving control signal SCTL1. Thus, the PWM controller 462 generates the PWM signal of a frequency which corresponds to the driving control signal SCTL1 from the inverting converter controller 470 to adjusting frequencies of the switch circuit 466.

The switch controller 464 controls switching operations of switch circuit 466 based on the PWM signal. Thus, the switch controller 464 provides control signals to the switch circuit 466 to turn on or off transistors in the switch circuit 466 based on the PWM signal.

The switch circuit 466 may include a plurality of switch transistors. The switch circuit 466 converts the input power voltage Vin to the second power voltage ELVSS by turning on or off the switch transistors.

In one embodiment, the switch circuit 466 may include a first switch transistor T1-1, a second switch transistor T2-1, and a third switch transistor T3-1. The first switch transistor T1-1 is between the input terminal and a first node N1-1. The first switch transistor T1-1 is turned on in response to the control signal received from the switch controller 464 to allow current to flow through a first inductor L1.

The second switch transistor T2-1 is between the first node N1-1 and the second output terminal. The first switch transistor T1-1 and the second switch transistor T2-1 may be alternately turned on or off. After the first switch transistor T1-1 is turned on and an electric motive force is generated by the first inductor L1, the second switch transistor T2-1 is turned on to convert the input power voltage Vin to the second power voltage ELVSS. The second power voltage ELVSS is output to the second output terminal.

The third switch transistor T3-1 is between the input terminal and the inverting converter controller 470. The first switch transistor T1-1 and the third switch transistor T3-1 may operate in response to the same control signal. Therefore, the third switch transistor T3-1 may provide the check current Ia to the inverting converter controller 470 by mirroring the first switch transistor T1-1 when the first inductor L1 is connected between the first node N1-1 and a reference (e.g., ground) voltage.

For example, the first switch transistor T1-1 and the third switch transistor T3-1 are turned on. The second switch transistor T2-1 is turned off. When the inductor is connected to the inverting converter, the current flows through the inductor. Therefore, the check current may flow through the third switch transistor T3-1. On the other hand, when the inductor is not connected to the inverting converter, the check current may not flow because the first node N1-1 becomes a floating node.

The second inverting converter 480 may include a PWM controller 482, a switch controller 484, and a switch circuit 486. The PWM controller part 482, the switch controller 484, and the switch circuit 486 of the second inverting converter 480 may be substantially the same as the PWM controller 462, the switch controller 464, and the switch circuit 466 of the first inverting converter 460.

The inverting converter controller 470 may include current sensors 472-1 and 472-2 and a driving controller 476. The current sensor 472-1 and 472-2 may check whether each of the inverting converters is connected to the inductor based on the check current from the inverting converters, to generate check voltages VCHK1 and VHCK2. In one embodiment, when the current sensors 472-1 and 472-2 receive a sensing signal SEN, the current sensors 472-1 and 472-2 generate sensing voltages VSEN1 and VSEN2 using the check current Ia, and check the connection state of the inductor by comparing the sensing voltages VSEN1 and VSEN2 with a second reference voltage VREF2.

For example, when a first current sensor 472-1 receives the sensing signal SEN (e.g., from an external source), the first current sensor 472-1 receives the check current from the first inverting converter 460 and generates the sensing voltage VSEN1. The first current sensor 472-1 generates a first check voltage VCHK1 for checking a connection state of the inductor by comparing the sensing voltage VSEN1 and the second reference voltage VREF2. In one embodiment, the sensing signal SEN may be applied to the current sensors 472-1 and 472-2 when the display device is initialized or at another predetermined time.

The driving controller 476 generates the driving control signals SCTL1 and SCTL2 based on the check voltages VCHK1 and VCHK2, and provides the driving control signals SCTL1 and SCTL2 to the inverting converters 460 and 480. For example, the driving controller 476 checks that the first inverting converter 460 is connected to the first inductor L1 based on the first check voltage VCHK1. The driving controller 476 checks that the second inverting converter 480 is not connected to the inductor based on the second check voltage VCHK2. The driving controller 476 provides a first driving control signal SCTL1 for controlling a single driving mode to the first inverting converter 460. The driving controller 476 provides a second driving control signal SCTL2 for preventing operation to the second inverting converter 480.

In one embodiment, when the driving controller 476 receives a driving mode selecting signal SMODE, the driving controller 476 generates the driving control signals SCTL1 and SCTL2 corresponding to the driving mode selecting signal SMODE and controls the inverting converters 460 and 480 based on the driving control signals SCTL1 and SCTL2. Thus, the driving controller 476 receives the driving mode selecting signal SMODE (e.g., from an external source) and selects the driving mode, thereby changing the driving mode of the inverting converters, for example, using software methods like a user input method, a hardware method like check method of connection state of the inductor, or both.

In addition, the second converter 450A may further include a feedback circuit 490. The feedback circuit 490 compares a feedback voltage from the second output terminal with a first reference voltage VREF1, and outputs a comparison result to the PWM controller 462. For example, the feedback circuit 490 receives the second power voltage ELVSS as the feedback voltage from the second output terminal. The feedback circuit 490 compares the feedback voltage and the first reference voltage VREF1 and outputs a comparison result to the PWM controller 462, thereby stably maintaining the second power voltage ELVSS.

Figure 4:
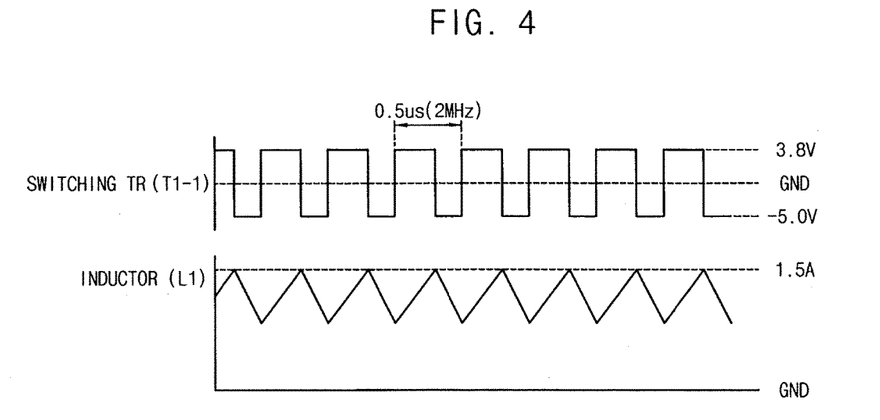
FIG. 4 illustrates an example of control signals for the second converter.

FIG. 4 illustrates an example of control signals for the switch circuit and a current flowing through an inductor in accordance with the second converter of FIG. 3. Referring to FIG. 4, in single driving mode, control signals applied to the switch circuit have a first frequency (e.g., 2 MHz) higher than control signals for simultaneous driving mode. For example, a PWM controller may receive the driving control signal for the single driving mode and generate a first PWM signal having a first frequency. A switch controller may control switching operations of the switch circuit based on the first PWM signal. The switch circuit may control the switching operation of the switch transistor based on the first PWM signal. The switch circuit may control the current flowing through the inductor L1 by turning on and off with the first frequency, and may convert the input power voltage to the second power voltage.

Figure 5:
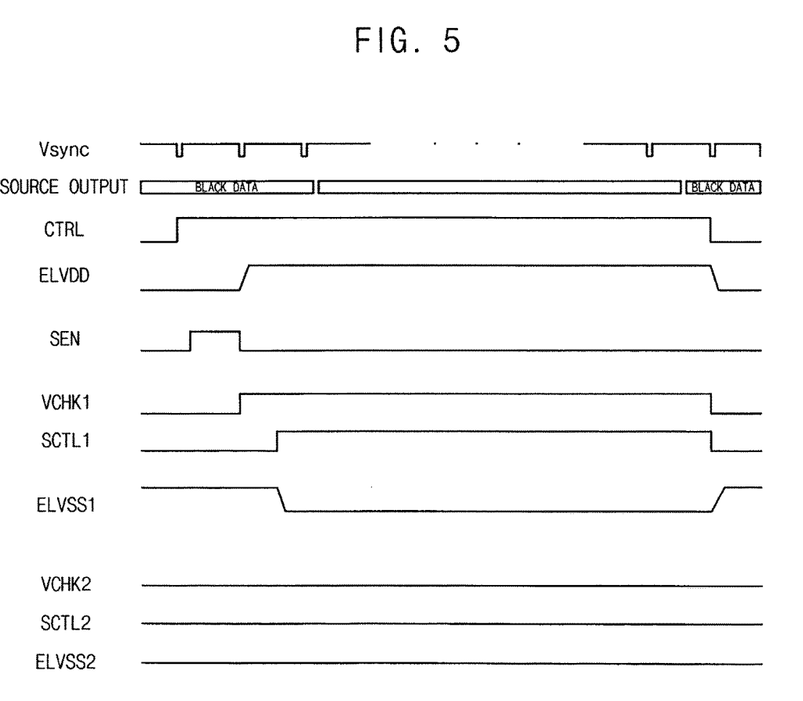
FIG. 5 illustrates an embodiment of a single driving mode of a DC-DC converter.

FIG. 5 illustrates an embodiment of a single driving mode for a DC-DC converter, which, for example, may be the DC-DC converter of FIG. 2. Referring to FIG. 5, a first inverting converter is connected to a first inductor and a second inverting converter may be not connected to any inductor. Therefore, a DC-DC converter may be driven in a single driving mode.

A current sensor in an inverting converter controller may receive a sensing signal SEN, check whether a check current is provided from the inverting converters, and generate check voltages VCHK1 and VCHK2. The first check voltage VCHK1 corresponding to the first inverting converter connected to the first inductor may be set to high level. The second check voltage VCHK2 corresponding to the second inverting converter not connected to any inductor may be set to low level. The driving controller may set the first driving control signal SCTL1 to high level in response to the first check voltage VCHK1. The driving controller may set the second driving control signal SCTL2 to low level in response to the second check voltage VCHK2.

Therefore, the first inverting converter may convert an input power voltage to a second power voltage ELVSS, and may output the second power voltage ELVSS because the first driving control signal SCTL1 is set to high level. On the other hand, the second inverting converter may be not operated because the second driving control signal SCTL2 is set to low level.

Figure 6:
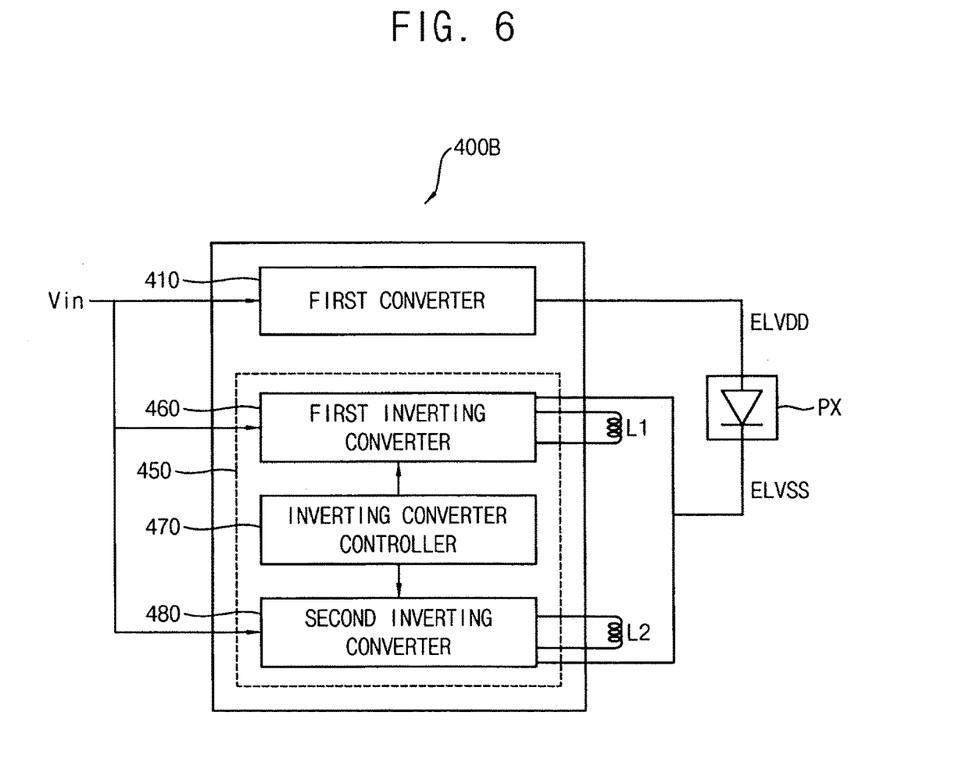
FIG. 6 illustrates another embodiment of a DC-DC converter.

FIG. 6 illustrates another embodiment of a DC-DC converter 400B, which may be included in an organic light emitting display device such as illustrated in FIG. 1. The DC-DC converter 400B may be substantially the same as the DC-DC converter of FIG. 2, except that a second inverting converter 480 is connected to a second inductor L2.

Referring to FIG. 6, the DC-DC converter 400B includes a first converter 410 and a second converter 450. The first converter 410 generates a first power voltage ELVDD based on an input power voltage Vin from an input terminal. The first power voltage ELVDD is output to a first output terminal. The second converter 450 generates a second power voltage ELVSS based on the input power voltage Vin. The second power voltage ELVSS is output to a second output terminal.

The second converter 450 includes a first inverting converter 460, a second inverting converter 480, and an inverting converter control part 470. The first inverting converter 460 and the second inverting converter 480 may operate when the inductor is connected. Thus, the inverting converter to which the inductor is connected may convert the input power voltage Vin to the second power voltage ELVSS and may output the second power voltage ELVSS. On the other hands, the inverting converter to which the inductor is not connected may not operate.

In FIG. 6, the first inverting converter 460 may be connected to a first inductor L1. The second inverting converter 480 may be connected to a second inductor L2. Therefore, the first inverting converter 460 and the second inverting converter 480 may generate a check current and provide the check current to the inverting converter controller 470. A switch circuit in the first inverting converter 460 or the second inverting converter 480 may operate in response to a PWM signal. The first inverting converter 460 and the second inverting converter 480 may convert the input power voltage Vin to the second power voltage ELVSS, by allowing or preventing a current to flow through the first inductor L1 and the second inductor L2 using the switch circuit. The first inverting converter 460 and the second inverting converter 480 may output the second power voltage ELVSS.

The inverting converter controller 470 may generate a driving control signal based on the check current to operate a predetermined number (e.g., one or more) of the inverting converters connected to the inductor, and to control the inverting converters using the driving control signal. For example, the inverting converter controller 470 may control the first inverting converter 460 and the second inverting converter 480 based on the check current from the first inverting converter 460 and the second inverting converter 480, such that the second converter 450 operates in simultaneous driving mode in which the first inverting converter 460 and the second inverting converter 480 operate.

Therefore, the DC-DC converter 400B may operate in the simultaneous driving mode and may output the second power voltage ELVSS based on the first inverting converter 460 and the second inverting converter 480. For example, when capability of each inverting converter is 500 mA, the DC-DC converter 400B may provide power voltages to the display panel through which current higher than 500 mA and lower than 1A flows. The DC-DC converter 400B may generate the power voltages using two inverting converters for providing the power voltages, thereby preventing an increase in the amount of current flowing through each inductor. Therefore, the DC-DC converter 400B may decrease conduction loss in the inductors and switch transistors. When driven in simultaneous driving mode, the DC-DC converter 400B may have higher conversion efficiency than in single driving mode, e.g., when the display panel is driven based on flow of current higher than 500 mA and lower than 1A.

Figure 7:
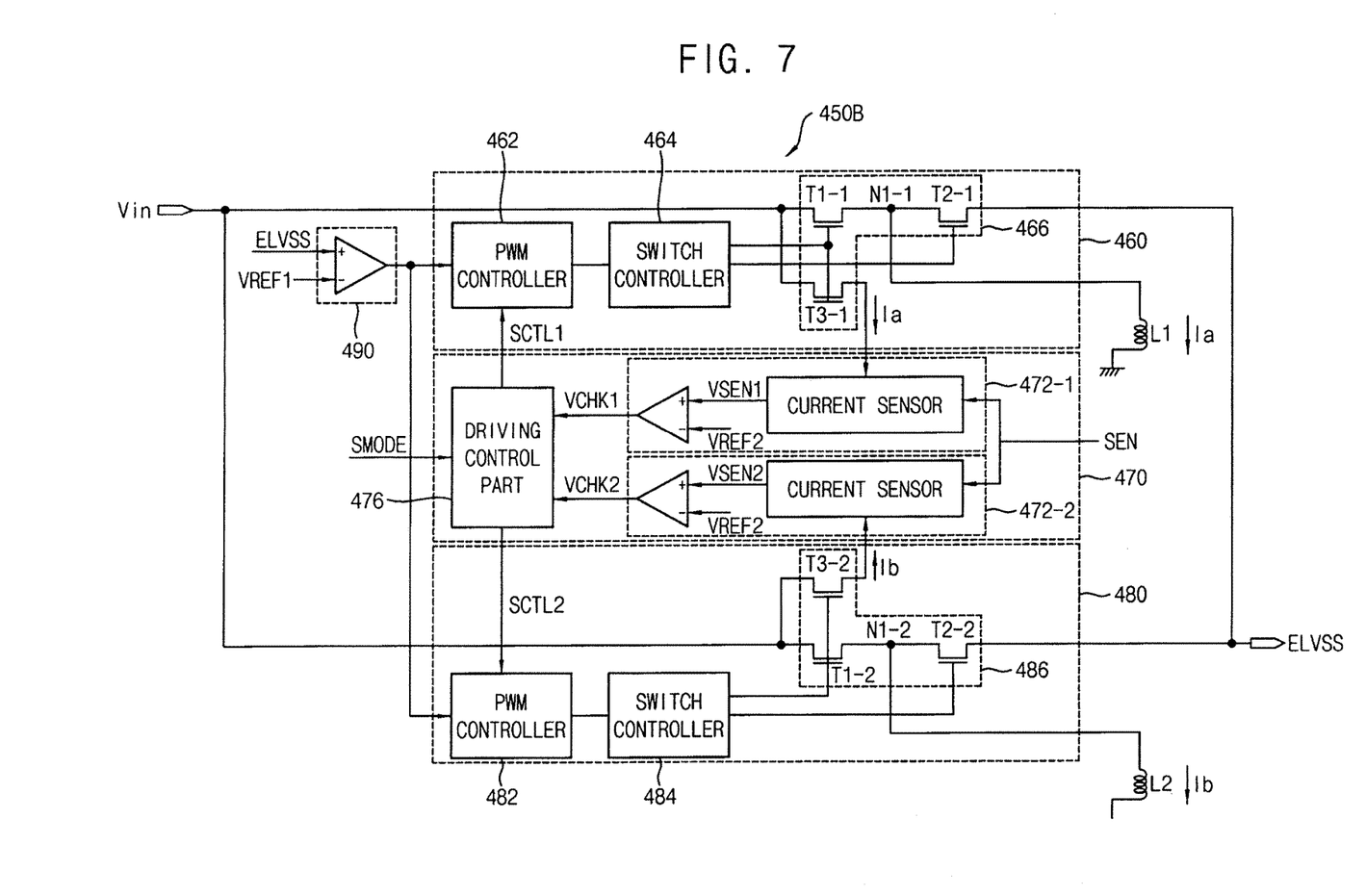
FIG. 7 illustrates another example of a second converter.

FIG. 7 illustrates another embodiment of a second converter, which, for example, may be included in the DC-DC converter of FIG. 6. The second converter 450B may be substantially the same as the second converter of FIG. 3, except that a second inverting converter 480 is connected to a second inductor L2.

Referring to FIG. 7, the second converter 450B includes a first inverting converter 460, a second inverting converter 480, and an inverting converter controller 470. The first inverting converter 460 and the second inverting converter 480 may include PWM controllers 462 and 482, switch controllers 464 and 484, and a switch circuits 466 and 486. The first inverting converter 460 is connected to a first inductor L1 and generates a first check current Ia. The second inverting converter 480 is connected to a second inductor L2 and generates a second check current Ib. The first inverting converter 460 and the second inverting converter 480 outputs a second power voltage ELVSS by converting the input power voltage Vin.

The inverting converter controller 470 may include current sensors 472-1 and 472-2 and a driving controller 476. The current sensors 472-1 and 472-2 may check whether each of the inverting converters 460 and 480 is connected to the inductor L1 L2 based on the check current Ia Ib from the inverting converters, to generate check voltages VCHK1 an dVHCK2.

The driving controller 476 generates the driving control signals SCTL1 and SCTL2 based on the check voltages VCHK1 and VCHK2, and provides the driving control signals SCTL1 and SCTL2 to the inverting converters 460 and 480. For example, the driving controller 476 checks that the first inverting converter 460 is connected to the first inductor L1 based on the first check voltage VCHK1 corresponding to the first inverting converter 460. Also, the driving controller 476 checks that the second inverting converter 480 is connected to the second inductor L2 based on the second check voltage VCHK2 corresponding to the second inverting converter 480. The driving controller 476 provides a first driving control signal SCTL1 and a second driving control signal SCTL2 for operating as the simultaneous driving mode to the first inverting converter 460 and the second inverting converter 480.

Figure 8:
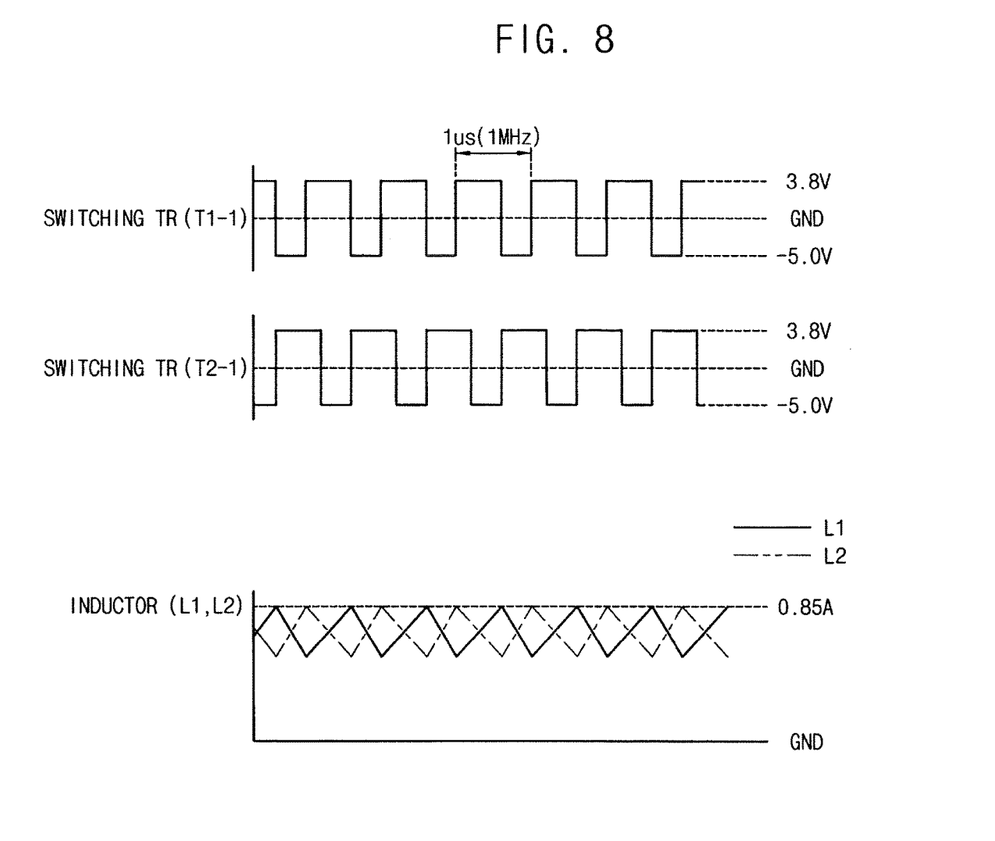
FIG. 8 illustrates another example of control signals for a second converter.

FIG. 8 illustrates an example of control signals for the switch circuit(s) and a current flowing through the inductor in a second converter of FIG. 7. Referring to FIG. 8, in simultaneous driving mode, control signals applied to the switch circuit have a second frequency (e.g., 1 MHz) lower than control signals for single driving mode.

In one embodiment, the first frequency for the single driving mode is a predetermined number (e.g., two) times larger than the second frequency of the simultaneous driving mode. For example, the PWM controller of the first inverting converter and the second inverting converter may receive the driving control signal for the simultaneous driving mode and generate the first PWM signal and the second PWM signal having the second frequency. The switch controller may control switching operations of the switch part based on the first PWM signal and the second PWM signal. The switch circuit may control the current flowing through the inductors L1 and L2 by turning on and off with the second frequency, and may convert the input power voltage to the second power voltage.

In one embodiment, the first PWM signal and the second PWM signal may have opposite phases to each other in simultaneous driving mode. For example, the second PWM signal may be set to the high level when the first PWM signal is set to the low level, such that a first phase of current flowing through the first inductor L1 and a second phase of current flowing through the second inductor L2 are opposite to each other. Therefore, although the first inverting converter and the second the first inverting converter are driven at the second frequency (e.g., 1 MHz) in simultaneous driving mode, the output voltage is output at 2 MHz frequency, which is the same as the first frequency (e.g., 2 MHz) of the single driving mode. This may reduce ripple of the output voltage. Also, the first inductor L1 and the second inductor L2 may be driven at the second frequency lower than the first frequency, to thereby increase conversion efficiency of the inverting converter.

Figure 9:
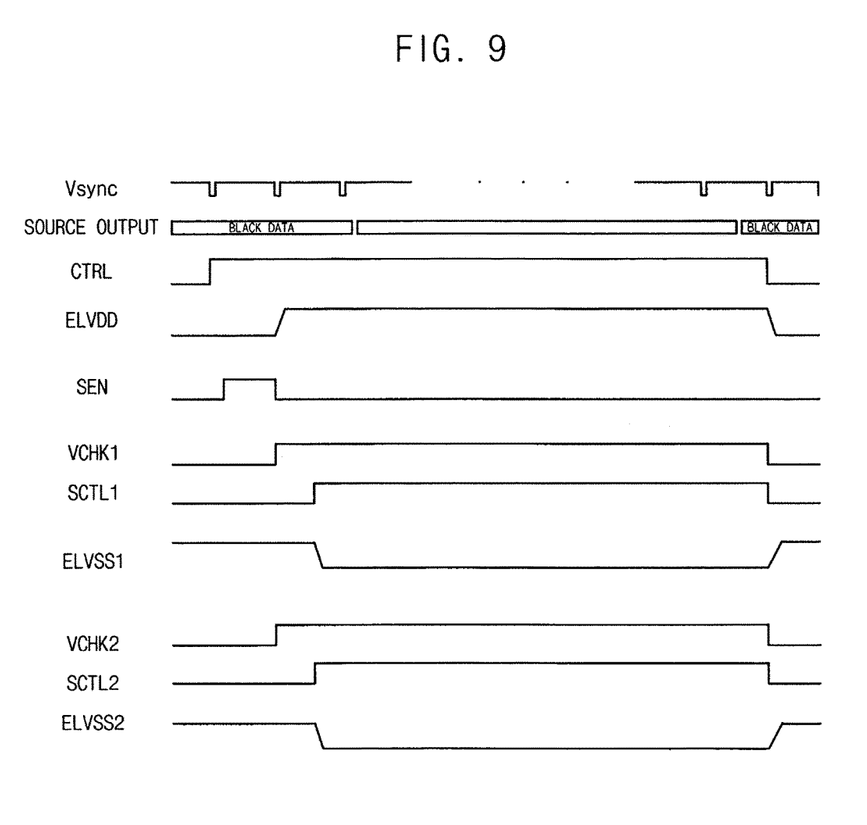
FIG. 9 illustrates an embodiment of a simultaneous driving mode.

FIG. 9 illustrates an embodiment of simultaneous driving mode of a DC-DC converter, which, for example, may be the DC-DC converter of FIG. 2. Referring to FIG. 9, a first inverting converter may be connected to a first inductor. A second inverting converter may be connected to second inductor. Therefore, a DC-DC converter may be driven in simultaneous driving mode.

A current sensor in an inverting converter controller may receive a sensing signal SEN, check whether a check current is provided from the inverting converters, and generate check voltages VCHK1 and VCHK2. Therefore, the first check voltage VCHK1 corresponding to the first inverting converter connected to the first inductor may be set to high level. Also, the second check voltage VCHK2 corresponding to the second inverting converter connected to second inductor may be set to high level. The driving controller may set the first driving control signal SCTL1 to high level based on the first check voltage VCHK1 and the second driving control signal SCTL2 to high level based on to the second check voltage VCHK2. The first inverting converter may convert an input power voltage to a second power voltage ELVSS1 and output the second power voltage ELVSS, because the first driving control signal SCTL1 is set to high level. Similarly, the second inverting converter may convert the input power voltage to the second power voltage ELVSS2 and output the second power voltage ELVSS2, because the second driving control signal SCTL2 is set to high level.

In FIGS. 6 through 9, the second converter includes two inverting converters and operates in simultaneous driving mode using the two inverting converters. In another embodiment, the second converter may include a different number of inverting converters, e.g., more than 2. In addition, in the simultaneous driving mode using N inverting converters (where N is an integer greater than 2), frequencies of the PWM signals are N times smaller than frequency of the single driving mode. Also, the PWM signals are shifted as mush as 1/n of period to each other, thereby reducing ripple of an output voltage.

Therefore, a DC-DC converter automatically controls a driving mode of inverting converter according to connection state of an inductor, thereby reducing ripple of an output voltage and increasing conversion efficiency of the DC-DC converter. The DC-DC converter generate power voltages to drive display panels of various sizes and scales, because the DC-DC converter is able to easily control the driving mode based on the connection state of the inductor. Thus, the DC-DC converter includes inverting converters connected in parallel with each other to efficiently generate the low power voltage (e.g., ELVSS).

In addition, the DC-DC prevents overload condition of an inverting converter, because a connection fault inverting converter disconnected from the inductor does not operate automatically.

The aforementioned embodiments may be applied to an electronic device having the organic light emitting display device. Examples of such an electronic device includes but is not limited to a cellular phone, a smart phone, a smart pad, and a personal digital assistant (PDA).

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A DC-DC converter, comprising:
   a first converter to generate a first power voltage based on an input power voltage from an input terminal, and to output the first power voltage to a first output terminal; and
   a second converter to generate a second power voltage lower than the first power voltage based on the input power voltage, and to output the second power voltage to a second output terminal, wherein the second converter includes:
   a plurality of inverting converters, a first inverting converter to generate a check current to check a connection state of an inductor when the inductor is connected to the first inverting converter and to output the second power voltage, the second power voltage to be generated by converting the input power voltage in response to a pulse width modulation (PWM) signal, and to withhold output of the check current when the inductor is not connected to the first inverting converter; and
   an inverting converter controller to generate one or more driving control signals based on the check current to operate a predetermined number of the inverting converters, and to control the inverting converters based on the one or more driving control signals.

2. The converter as claimed in claim 1, wherein each of the inverting converters includes:
   a switch circuit including a plurality of switch transistors, the switch circuit to convert the input power voltage to the second power voltage by turning on or off one or more of the switch transistors;
   a switch controller to control switching operations of the switch transistors based on the PWM signal; and
   a PWM controller to generate the PWM signal based on the driving control signal.

3. The converter as claimed in claim 2, wherein the switch circuit includes:
   a first switch transistor between the input terminal and a first node;
   a second switch transistor between the first node and the second output terminal; and
   a third switch transistor between the input terminal and the inverting converter controller, the third switch transistor to provide the check current to the inverting converter controller when the inductor is connected between the first node and a reference voltage.

4. The converter as claimed in claim 3, wherein the first switch transistor and the third switch transistor operate based on a same control signal.

5. The converter as claimed in claim 3, wherein the first switch transistor and the second switch transistor are alternately turned on and off.

6. The converter as claimed in claim 2, wherein the second converter includes a feedback circuit to compare a feedback voltage from the second output terminal with a first reference voltage, and to output a comparison result to the PWM controller.

7. The converter as claimed in claim 1, wherein the inverting converter controller includes:
 a number of current sensors to check whether the inverting converters are connected to the inductor based on the check current from the inverting converters to generate a check voltage; and
 a driving controller to generate the driving control signal based on the check voltage and to provide the one or more driving control signals to the inverting converters.

8. The converter as claimed in claim 7, wherein:
 when each of the number of current sensors receives a sensing signal, each of the current sensors is to generate a sensing voltage based on the check current and is to check the connection state of the inductor by comparing the sensing voltage with a second reference voltage.

9. The converter as claimed in claim 7, wherein:
 when the driving controller receives a driving mode selecting signal, the driving controller is to generate the one or more driving control signals corresponding to the driving mode selecting signal and is to control the inverting converters based on the one or more driving control signals.

10. The converter as claimed in claim 1, wherein the inverting converters include a second inverting converter.

11. The converter as claimed in claim 10, wherein:
 a first PWM signal of the first inverting converter and a second PWM signal of the second inverting converter have a first frequency during a simultaneous driving mode, in which the first inverting converter and the second inverting converter operate simultaneously, and
 the first PWM signal of the first inverting converter has a second frequency a predetermined number of times larger than the first frequency during a single driving mode, in which the first inverting converter operates and the second inverting converter does not operate.

12. The converter as claimed in claim 11, wherein the first PWM signal and the second PWM signal have opposite phases during the simultaneous driving mode.

13. The converter as claimed in claim 1, wherein the predetermined number of the inverting converters is less than all of the inverting converters.

14. The converter as claimed in claim 1, wherein the one or more driving control signals are to deactivate an output of a second inverting converter when the inductor is connected to the first inverting converter.

15. An organic light emitting display device, comprising:
 a display panel including a plurality of pixels;
 a scan driver to provide a scan signal to the pixels;
 a data driver to provide a data signal to the pixels; and
 a DC-DC converter to generate a first power voltage and a second power voltage lower than the first power voltage, and to provide the first power voltage and the second power voltage to the pixels, wherein the DC-DC converter includes:
  a first converter to generate the first power voltage based on an input power voltage from an input terminal, and to output the first power voltage to a first output terminal; and
  a second converter to generate the second power voltage based on the input power voltage and to output the second power voltage to a second output terminal, and wherein the second converter includes:
  a plurality of inverting converters, a first inverting converter to generate a check current to check a connection state of an inductor when the inductor is connected to the first inverting converter and to output the second power voltage, the second power voltage to be generated by converting the input power voltage based on a PWM signal, and to withhold output of the check current when the inductor is not connected to the first inverting converter; and
  an inverting converter controller to generate one or more driving control signals based on the check current to operate a predetermined number of the inverting converters, and to control the inverting converters based on the one or more driving control signals.

16. The display device as claimed in claim 15, wherein each of the inverting converters includes:
 a switch circuit including a plurality of switch transistors, the switch circuit to convert the input power voltage to the second power voltage by turning on or off the switch transistors;
 a switch controller to control switching operations of the switch transistors based on the PWM signal; and
 a PWM controller to generate the PWM signal based on the one or more driving control signals.

17. The display device as claimed in claim 16, wherein the switch circuit includes:
 a first switch transistor between the input terminal and a first node;
 a second switch transistor between the first node and the second output terminal; and
 a third switch transistor between the input terminal and the inverting converter controller, the third switch transistor providing the check current to the inverting converter controller when the inductor is connected between the first node and a ground voltage.

18. The display device as claimed in claim 15, wherein the inverting converter controller includes:
 a number of current sensors to check whether the inverting converters is connected to the inductor based on the check current from the inverting converters, and to generate a check voltage; and
 a driving controller to generate the one or more driving control signals based on the check voltage, and to provide the one or more driving control signals to the inverting converters.

19. The display device as claimed in claim 15, wherein the inverting converters include a second inverting converter.

20. The display device as claimed in claim 19, wherein:
 a first PWM signal of the first inverting converter and a second PWM signal of the second inverting converter have a first frequency during a simultaneous driving mode, in which the first inverting converter and the second inverting converter operate simultaneously, and
 the first PWM signal of the first inverting converter has a second frequency a predetermined number of times larger than the first frequency during a single driving mode, in which the first inverting converter operates and the second inverting converter does not operate.

21. The display device as claimed in claim 20, wherein the first PWM signal and the second PWM signal have opposite phases during the simultaneous driving mode.

\* \* \* \* \*